3,445,247
FREEZE DRIED PRODUCT AND PROCESS FOR
PRODUCING THE SAME
Francis K. Baerwald, San Rafael, Calif., assignor to Basic
Vegetable Products, Inc., San Francisco, Calif.
Continuation-in-part of application Ser. No. 119,709,
June 26, 1961. This application Oct. 8, 1964, Ser.
No. 405,009
Int. Cl. B01d 1/00; A23f 1/08; F26b 5/06
U.S. Cl. 99—199                                    4 Claims This application claims the priority and is a continuation-in-part of my earlier filed application entitled "Dried Product and Process and Apparatus for Producing Same," Ser. No. 119,709, filed June 26, 1961, now abandoned, for the common subject matter therein.

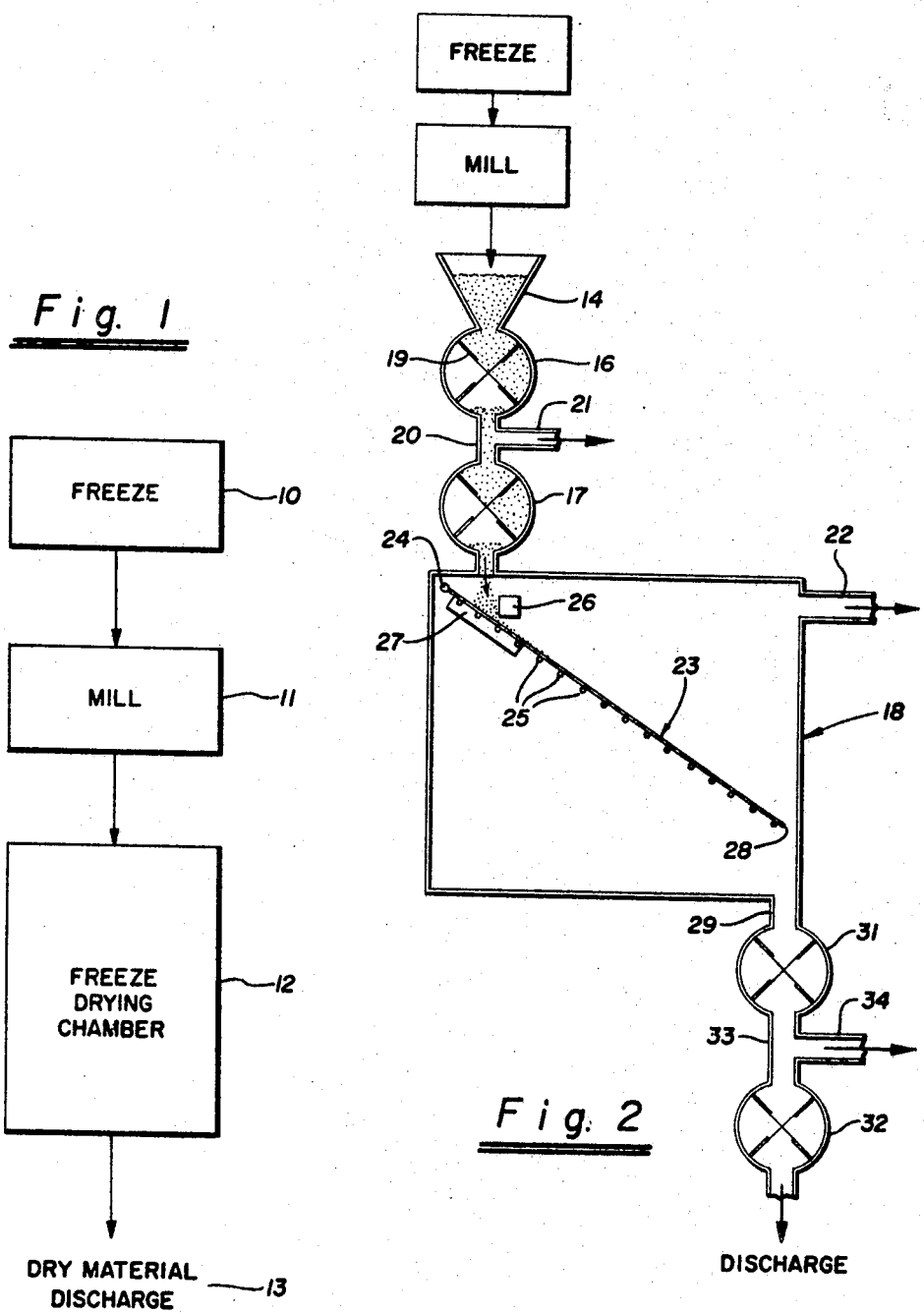

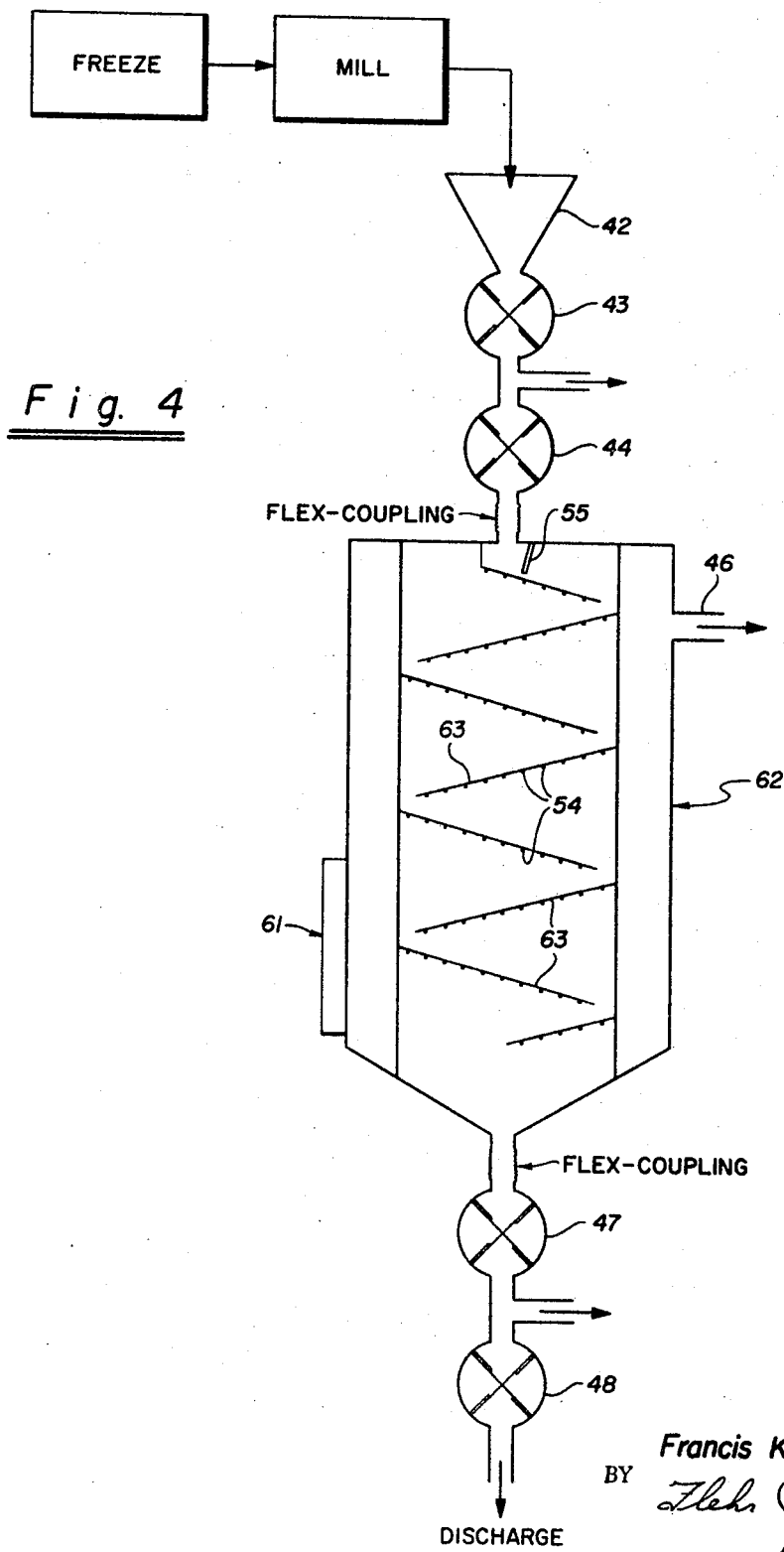

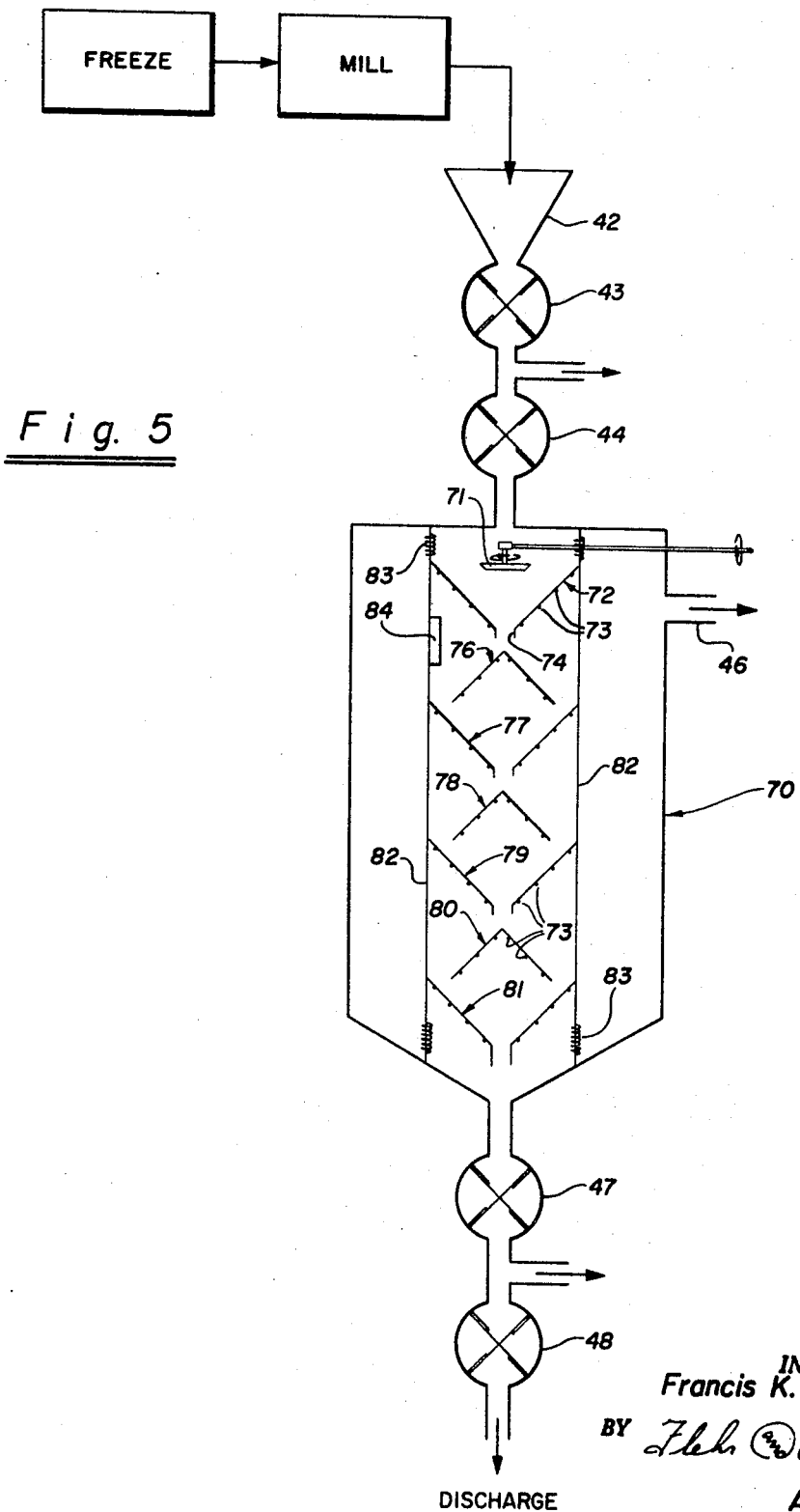

This invention relates to a dried product and to the apparatus and process for producing the same. More particularly it relates to the process for rapidly and economically freeze drying finely divided matter of either organic or inorganic origin, to the apparatus for so doing and to the product produced thereby.

The quality and desirability of most preserved and processed food products is generally evaluated by the degree to which their flavor, color, aroma and nutritional value approaches, equals or surpasses those properties of the fresh, unprocessed commodity when it is consumed in a normal manner, that is, raw and unprepared or prepared. Changes in flavor, aroma, etc., are due to chemical reactions between the chemical constituents of the food products themselves or between those constituents and outside agents, for example, air, contacting them during the preparation for processing or during the processing itself. Such reactions take place preferably when water in liquid form is present, when heat is applied, and when the chemical constituents of the food product are allowed to interact due to cell rupture occurring in preparation and reduction in particle size of the fresh product.

It is an object of this invention to provide a dried product in which there is a minimum or complete absence of any change in flavor, aroma, color, and nutritional value and in which there has been no reaction between the chemical constituents of the food products or their constituents and outside agents.

The process of freeze drying is characterized by heating a water-containing frozen product in a vacuum chamber maintained at an absolute pressure below the vapor pressure of the ice within the product. Such heating can be accomplished by conventional methods as, for example, conduction, radiation, induction, radio-frequency, etc. When heat is applied to the frozen product by any of these methods, the water contained in the product in the form of ice changes from the solid ice phase directly into the vapor phase. The water vapor liberated from the ice in the frozen product must be removed from the vacuum chamber to prevent pressure build-up in order that the process of freeze drying may continue. Water removal is accomplished by condensing the liberated water vapor on refrigerated surfaces at temperatures below the temperature of the ice in the product. For this reason the vacuum chamber is connected to or incorporates a condensing system which, in turn, is connected to suitable device for vapor removal, that is, vacuum pumps or steam ejectors.

Heretofore, freeze drying as it was commonly practiced, was a slow process of drying requiring never less than three hours and frequently as long as twelve or twenty-four hours to transform frozen material into dry material, that is, into a material having a moisture content of from 1 to 8 percent.

It is an object of this invention to provide a process and apparatus in which freeze drying, or the transformation of frozen material into dry material, may be accomplished substantially instantaneously in the case of finely divided material, or a period of not to exceed thirty minutes in the case of particles of larger size. In conventional freeze drying practice, the vacuum chamber is charged by placing the material in trays which themselves are placed on shelves within the chamber. After the chamber is charged, the pressure is reduced therein to the desired level; usually one thousand microns or less, and thermal energy is applied to the material usually by circulating a heated liquid or gaseous medium through the shelves carrying the product-laden trays. There are, of course, numerous modifications of this general method and apparatus. For example, an air lock system may be used permitting the continuous introduction and removal of product-containing trays into and out of the vacuum chamber. Another reported method, although not actually used to my knowledge, visualizes the introduction of frozen material into the vacuum chamber and withdrawal of the material after freeze drying through air locks and on moving belts.

All of these methods have one common fault, that is, the introduction of a large or maximum amount of frozen material into a vacuum chamber at one time to utilize to the fullest extent the available limited space in the vacuum chamber and to minimize the time and labor required in preparation and the auxiliary steps of transferring frozen material on to the drying trays, unloading the trays, and in creating and terminating the vacuum.

All of the foregoing methods of freeze drying are limited by the difficulty of transferring heat to the ice phase in the product and of transporting water vapor through from the ice core in the center through the dried exterior portion of the product, toward the condenser. When heat is applied to a fozen mass of product in a vacuum chamber at the low pressure usually applied, the surface of the mass of material and the surface of the particles thereof dry rapidly, leaving an increasingly thick layer of insulating dry material surrounding the decreasing ice core. This insulating material increasingly interferes with the complete removal of the last of the ice core within the product. If the mass of product being dried is in a thick bed, the problem of heat transfer is magnified, and since the amount of heat which can be applied at any time is limited by the heat sensitivity, or tolerance, of the dried portion of the material which, in the case of foodstuffs, is low, rendering them unusually subject to scorching or discoloration, the problem is likewise magnified. The dried portion of the partially frozen mass of product not only forms a most effective barrier against heat transfer, but also eventually interferes with the removal of water vapor liberated from the ice, to a degree depending on the physical consistency and chemical composition of the product being subjected to freeze drying. This is particularly true if the material is of large size, is not finely divided, or contains fatty or mucilaginous matter. In this case, unless the heat output is reduced, localized areas of high vapor pressure within the mass of the product may develop, resulting in partial thawing and failure of the freeze drying process.

Thus, the limitations of conventional freeze drying apparatus and processes result in long drying periods, inefficient use of heating and refrigeration energy used in the sublimation and condensing operations. I have found, for example, that in a total drying period of fifteen hours, seventy-five percent of the moisture is removed within the first three hours, and the remaining twelve hours is used to extract twenty-five percent of the moisture. This dramatically illustrates the inefficient utilization of equipment as well as the inefficient use of heating and refrigeration energy.

It is an object of this invention to provide a method and apparatus which overcomes the aforesaid limitations and permits rapid freeze drying of foodstuffs and other suitable materials in a continuous process.

These and other objects and advantages will be made clear from the following specification taken in conjunction with the accompanying drawings in which:

FIGURE 1 is a flow sheet disclosing my process.

FIGURE 2 is a simplified form of equipment useful in connection with my process.

FIGURE 4 is a second modification of the equipment which might be used; and

FIGURE 5 is a third modification of the type of equipment which may be utilized in carrying out my process.

Figure 3:
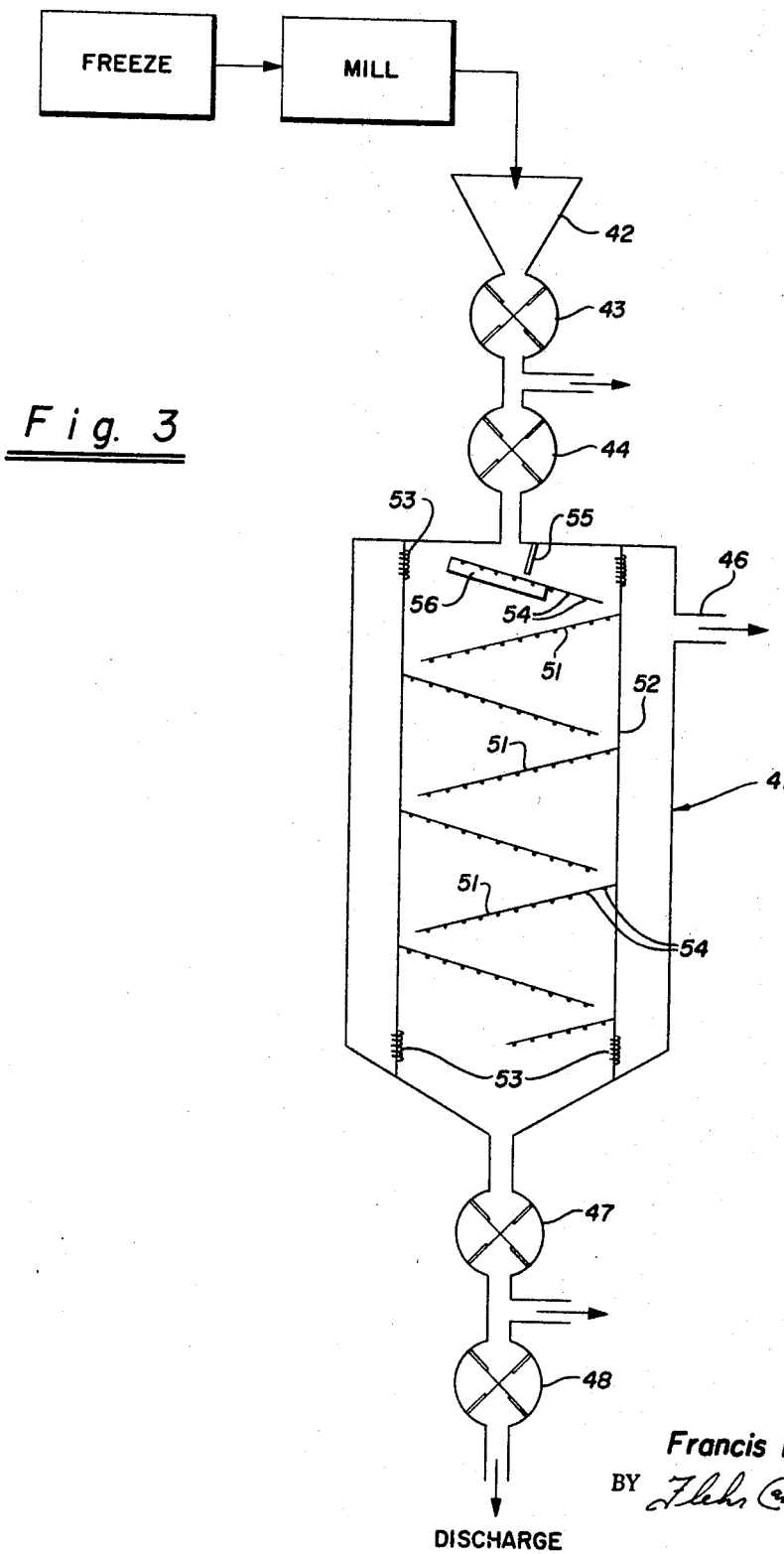
FIGURE 3 is a modified piece of equipment.

I have discovered if a mass of frozen, finely divided material, is spread in a single-particle layer on a surface in a vacuum chamber, with the particles in said layer being separated in discrete units, and if, in addition, these units of frozen material are heated by any suitable means, and preferably by heating of the contacting surface, that heat transfer and transfer of water vapor from these particles is rapid or instantaneous.

For example, I have deposited frozen finely divided vegetable matter containing more than seventy percent water, and sufficiently finely divided to pass through a forty-eight mesh screen, in a single layer on a metal plate. I have then introduced this plate into freeze drying apparatus, consisting of a vacuum chamber containing an electric hot plate, a condenser and a vacuum pump. Three minutes after the pressure in the vacuum chamber was reduced to three hundred microns and the temperature of the plate carrying the finely divided frozen material had reached 70° F., the freeze drying operation was terminated and it was found that the material was completely dry although the temperature of the material never exceeded 33° F.

I have also discovered that if frozen finely divided material is spread in a single layer on a surface in a vacuum chamber and is moved over the surface by inclining or by vibrating the surface, so that the frozen discrete particles contact the surface continuously or intermittently but with constantly changing portions of their surface, and by applying heat to said frozen particles by any suitable means, but preferably by heating the surface over which the material passes, the rate of drying is further enhanced and at the same time a means is found to transform the freeze drying process from a batch process to a continuous process.

As illustrated particularly in FIGURE 1, I freeze the material in any suitable equipment 10, bringing it to a sufficiently low temperature so that all the moisture contained therein is frozen. The material is then ground or milled at 11 into the desired particle size, in this case, for example, from 20 to 100 mesh. These values are illustrative only and it is to be understood that the particle size may vary from product to product.

The finely divided material, still in frozen condition, is then introduced into the vacuum tank 12 where heat is applied and water is removed to a condenser and the dry product is discharged at 13 from the vacuum tank 12.

In FIGURE 2 I have disclosed an arrangement which is particularly adapted to be used in connection with my process.

Finely divided frozen material is introduced into a feed hopper 14 from which it passes through air lock feeders 16 and 17 into the vacuum tank 18. The air lock feeders 16 and 17 are substantially conventional in their construction and may be of any desired type, it being important only that they prevent the entry of atmospheric air into the vacuum tank. As illustrated in the drawings, however, these consist generally of cylindrical bodies 19 which are provided with rotating compartmented locks which receive the finely divided frozen material and discharge the same. The air lock feeders 16 and 17 are connected by a passageway 20 which is in communication with a source of vacuum and a condenser through the piping 21.

Vacuum tank 18 is likewise in communication with a source of vacuum and a condenser, not shown, through the piping 22. A cascade plate 23 is pivotally mounted at 24 within the tank 18 so that its degree of slope, or angularity, may be readily adjusted to any point between horizontal and 45°, for example.

The cascade plate 23 is provided with a heating element 25 which is adapted to heat the entire plate 23 to a desired temperature. The element 23 may either be an electric element or it may be a hollow coil assembly through which heated fluid, either liquid or gaseous, may be circulated to heat and maintain a predetermined desired heat on the plate 23 and is preferably mounted on the underside of the plate 23.

A spreading device 26 may be mounted immediately over the upper surface of the plate 23 and adjacent the point at which the finely divided frozen material engages the plate 23 after it leaves the air lock feeder 17. The spreading device 26 may be of any type and, for example, may consist of simply a plate which is adjustably mounted so that its position with respect to the surface of the plate 23 may be altered to determine the thickness of the layer of finely divided frozen material upon the plate 23 and to spread the material evenly across the upper surface of the plate 23.

A vibration unit 27 may also be mounted on the lower side of the plate 23. In the event vibration unit 27 is utilized, the pivotal connection 24 between the plate 23 and the vacuum tank 18 should be provided with vibration dampeners, in the form of springs, for example.

The specific vibration unit and specific vibration dampeners are not illustrated and, it is believed that any suitable form may be utilized.

Any material cascading over the lower end 28 of the plate 23 will discharge into passageway 29 and then through air lock outlets 31 and 32 to further processing or packaging. The passageway 33 between the air lock outlet members 31 and 32 is likewise connected to vacuum means and the condenser by means of piping 34 in the same manner that the passageway 20 is connected to the condenser and vacuum by the piping 21. When the material is discharged from the air lock outlet 32 it is in completely dried condition.

Operation of the unit shown in FIGURE 2 may briefly be described as follows.

The position of the cascade plate 23 is first adjusted so that the desired degree of angularity is achieved. This degree of angularity will depend upon the material being dried, and may vary from material to material. The position of the spreading device 26 with respect to the upper surface of the member 23 may likewise be adjusted depending upon the particle size of the material to be dried.

The vacuum pump and condenser will be placed in operation so that the desired degree of vacuum is drawn.

The heating element will also be operated so that the surface of the plate 23 will be brought to the desired temperature, preferably a temperature well below that which might scorch or otherwise damage the product. When the operator has determined that the desired degree of vacuum exists within the tank 18 and that the surface of the heating element 23 is at the desired temperature, finely divided frozen material is introduced into the feed hopper 14 and is passed through the air lock feeders 16 and 17 into the vacuum chamber 18. As the finely divided frozen material falls upon the upper surface of the cascade plate 23, it is spread by the spreading device 26 into a uniformly thin layer over the upper surface of the plate 23. The material then tumbles or rolls down the plate 23 with the result that substantially the entire surface of each particle will engage the heated cascade plate 23. The ice within the finely divided particles will be vaporized immediately and the vapor will be withdrawn. The finely divided dry material will then pass through the air lock outlets 31 and 32 to suitable packaging or other equipment.

The vibration unit 27 may or may not be utilized. In the event it is utilized, the plate 23 may be adjusted to a less steep angle with the result that the material may remain on the plate for a slightly longer period of time.

In the modification illustrated in FIGURE 3, I provide a vacuum tank 41 in the form of an upright cylindrically shaped tank which is provided with a feed hopper 42 and air lock feeders 32 and 44 similar to those previously described. The tank 41 is connected to a suitable vacuum pump and condenser through piping 46 and its lower or discharge end is connected to the discharge outlet through air lock outlet devices 47 and 48. These units correspond substantially to those previously described in connection with the device illustrated in FIGURE 2.

The interior of the vacuum tank 41 is provided with a plurality of cascade plates 51, which are supported on a plurality of vertical spaced rods 52. The rods 52 are supported within the vacuum tank 41 by spring elements 53 which act as vibration dampeners and which permit both vertical and lateral movement of the plates 51 and the rods 52. Each of the cascade plates 51 is provided with a heating element 54 similar to that previously described in connection with the device illustrated in FIGURE 2. A spreading device 55 is positioned immediately above the uppermost cascade plate 51. It serves to spread a uniformly thin layer of finely divided frozen material over the upper cascade plate 51. The material will cascade from that plate to the one immediately below it in substantially the same uniform thinly spread layer. The vibration unit 56 may be utilized and it too corresponds to the vibration unit previously described in the device illustrated in FIGURE 2.

Operation of the apparatus disclosed in FIGURE 3 may briefly be described as follows.

Finely divided frozen material is introduced into the feed hopper 42 and fed through the members 43 and 44 into the vacuum tank 41. A desired degree of vacuum will have been created within the vacuum tank and the condenser will be in operation. The heating elements 54 will have been operated to bring the upper surface of the cascade plates 21 to their desired temperature. The position of the spreading device 52 with respect to the surface of the uppermost cascade plate 51 will likewise have been adjusted to produce a layer of the desired depth. The vibration unit 56 may be actuated. As the finely divided frozen material is introduced from the air lock feeder 44 into the vacuum tank 41 will engage the uppermost cascade plate 51 and be spread by the spreading device 35 into a uniformly thin layer over this plate. The vibration unit 56 will cause the finely divided material to cascade downwardly over the successive cascade plates 51 and the material will be dried as it passes over them and will be discharged from the vacuum tank 41 through the air lock outlet members 47 and 48.

The apparatus illustrated in FIGURE 4 is substantially the same as that illustrated in FIGURE 3, with the exception, however, that the vibration unit 56 of the unit disclosed in FIGURE 3 has been eliminated and a larger vibration unit 61 is secured to the outer surface of the vacuum tank 62. The vacuum tank 62 must be mounted upon suitable vibration dampeners and flexible couplings must be inserted in the inlet and outlet passageways to the vacuum tank. However, when the entire vacuum tank 61 is vibrated, the vibratory motion is imparted to the cascade plates 63 rigidly supported therein.

The apparatus illustrated in FIGURE 5 is similar to the apparatus illustrated in FIGURE 3 with the exception however, that the flat cascade plates 51 of FIGURE 3 have been eliminated and a plurality of conical devices have been substituted therefor.

The vacuum tank 70 and its auxiliary equipment such as the air lock feeders, air lock outlets, etc., are substantially identical to those illustrated in FIGURE 3. As the frozen finely divided material is introduced into the vacuum tank 70, however, it engages a rapidly rotating spreader plate 71 which is driven from an outside source, not shown, in such a manner that when the finely divided particles engage it they are projected radially outwardly therefrom. Substantially surrounding the spreading unit 71 I have provided a cone member 72 which is open at its lower end and which is provided with heating elements 73. As the finely divided material is spread by the member 71 it contacts the heated inner walls of the cone 72 and passes downwardly through the opening 74 onto the inverted cone member 76.

The inverted cone 76 is likewise heated and the finely divided partially dried material passes down over that into a second cone 77 which is likewise heated. The cones 76, 78 and 80 are substantially identical and the cones 72, 77, 79 and 81 are likewise substantially identical.

All of these cones are mounted upon vertical support rods 82 which are mounted within the vacuum tank 70 upon vibration dampeners or springs 83. A vibration unit 84 is mounted upon this assembly so that the entire assembly consisting of the rods 82 and the cones 72, 76, 77, 78, 79, 80 and 81 is vibrated. As the dried material passes through the centrally disposed outlet in the lowermost cone 81, it passes from the vacuum tank through the air lock outlets illustrated.

The process and apparatus previously disclosed herein produces a product of very small particle size, which retains all the nutritional and other values and qualities of the original product. As previously pointed out herein the quality and desirability of most preserved or processed food products is generally evaluated by the degree in which their flavor, aroma, color and nutritional value approaches, equals, or surpasses the same properties of the fresh unprocessed commodity when it is consumed in the normal manner, that is, either raw and unprepared or prepared. Changes in flavor and aroma, etc., are due to chemical reactions between the chemical constituents of the food products themselves or between those constituents and outside agents, for example, air, contacting them during the preparation for processing or during the processing operation itself. Such reactions take place preferably while the water in liquid form is present, when heat is applied, and when the chemical constituents of the food products are allowed to interact due to cell rupture occurring in preparation and reduction in particle size of the fresh product. This explains why most undesirable changes occur in canned or conventional dried food products and why freeze drying, that is, drying by sublimation, reduces such changes to a minimum.

Many food products are consumed and therefore preserved in large pieces. Up to the present, the limitations of conventional freeze drying processes and equipment precludes the large scale production of such products as, for example, green vegetables and other staple items. Many of these items are particularly useful when available in preserved condition in small particle size. Commodities cannot satisfactorily be freeze dried in large particle sizes since presently available equipment does not produce large pieces in uniform and satisfactory quality and present processes are uneconomical with low price commodities such as vegetables.

Finely divided preserved foodstuffs have many uses. For example, they may be used as spices and condiments like garlic, onion and horseradish. Some comprise foods which are consumed in pureed form such as soup ingredients and powders for use in gravies or other prepared dishes. Asparagus and tomatoes are typical items in this group. In addition, this group contains all those products which are useful in dietary foods, such as baby and geriatric goods and here we find string beans, spinach, asparagus, carrots, apricots and apples. Other finely divided dried products may be consumed in liquid form and the powders of tomatoes and other vegetables and apricots, peaches, apples and other fruits, including coffee, are representative of this group.

Other similar groups include those foods which, if they were available in dry powdered form, would lend themselves as ingredients in composite measured and concentrated diets, that is, diets with known and consistent caloric and nutritional values. Such products would comprise not only powdered or granular foods of vegetable origin, but those of animal origin, such as meat, poultry and fish.

None of these products of small particle size having characteristics equivalent to the fresh commodities have heretofore been available. This has been due primarily to the limitation of conventional freeze drying equipment and processes. Such products are now available by my process and apparatus.

I have produced the following enumerated products of small particle size and in so doing I have followed the process outlined previously, that is, freezing of the whole fresh commodity, milling or grinding, gradual introduction of the frozen comminuted product into my apparatus, freeze drying as outlined, and withdrawing the dried product as shown.

For example, I have produced a finely divided freeze-dried product from onion, garlic and horseradish of snow-like consistency and having unique characteristics which cannot be produced by any other known method. Garlic, onion and horseradish are consumed mainly for their characteristic flavor which is not present, as such in these products as a definite extractable compound. Instead, these vegetables contain flavor precursors and enzymes, which form the characteristic flavor, when the cells of the product are ruptured during consumption and in the presence of water. Whenever garlic, onions or horseradish are cut, sliced or comminuted before conventional freeze drying, this reaction takes place and the developed flavor is lost in subsequent drying. By utilizing my process it is possible to completely capture and preserve the flavor and retain it fully in the final product.

Similarly I have prepared powdered and granular common green vegetables, such as spinach, green beans, asparagus and peas. These fresh vegetables, after washing and trimming were first slightly cooked, then quickly frozen, milled and freeze dried. The resulting powder is reconstitutable instantaneously to a puree by the addition of hot water and the resulting puree has the natural flavor and color, and is indistinguishable from, freshly prepared and cooked puree of vegetables. The products were compared against commercially prepared products, that is, canned, pressure cooked baby foods of the same origin and there was no resemblance in color or flavor. The vast superiority of my product together with the increased convenience of being in dried form and of reduced bulk, identifies them as new foods.

I have also prepared tomato powder from peeled tomatoes which were frozen, after removal of the seeds, milled and freeze dried. The resulting powder reconstituted immediately to a puree of juice, depending on the quantity of water, and had the characteristic flavor of liquified fresh tomatoes completely unlike commercially produced canned tomato juice and unlike the scorched and fully reconstituted product obtained by conventional vacuum drying of concentrated tomato puree.

I have prepared a powdery snow-like product from avocado which has the flavor and color of fresh avocado. Ripe avocados were peeled and halved and the pits removed. The halves were frozen, milled and freeze dried and the resulting product was used in the preparation of spreads, salad dressings and aspics. This product is unique inasmuch as it is not possible to preserve avocado by any other method of food preservation.

I have also produced finely divided artichoke particles. The edible portion of the leaves, bottoms and stems, after preliminary cooking, was quick frozen, milled and freeze dried to produce an artichoke powed which reconstitutes instantly. There is no similar product in existence.

Fruits such as apples and apricots may also be processed without the use of sulphur dioxide. I have peeled and cored the product and removed the pits. It is then quick frozen, milled, and freeze dried to produce a new and unique fruit powder suitable for dietary feeding and as a base for nectars.

I have produced dried granular and powdered meat products including chicken and fish products suitable for use in composite concentrated diet foods in the same manner.

I have prepared and frozen freshly brewed coffee to produce coffee concentrate having varying solid contents but particularly concentrates of 27 to 28% solids. After freezing, the concentrates were milled and freeze dried. The resulting powder, upon addition of hot water, yielded instant coffee indistinguishable from fresh coffee and far superior to commonly available conventional spray dried instant coffee.

The freeze drying step as disclosed by this method, is a very rapid one and the length of time required to produce a completely dried product varies directly with the size of the particle. For example, with an extremely small particle I have found that the freeze drying step may be accomplished substantially instantaneously whereas with a particle of slightly larger size, as, for example, sufficient to pass a 20 mesh screen, the drying time is in the order of 3 to 5 minutes.

I claim:
1. A process for the rapid continuous production of a finely divided dehydrated food product from a moisture-containing food product while maintaining the flavor, color, and nutritional value of the fresh food product comprising the steps of:
  (a) bringing the moisture-containing food product to a sufficiently low temperature so that all the moisture contained therein is frozen,
  (b) grinding the frozen food product to a particle size range of about 20 to 100 mesh,
  (c) continuously introducing the ground frozen food product into a vacuum chamber,
  (d) spreading said ground food product over at least one drying plate in a uniformly thin layer of particle depth,
  (e) vibrating said drying plate or plates to move said thin layer of food product over the length of said drying plate or plates;
  (f) the combination of the amplitude and frequency of said vibrating and said particle depth causing substantially the entire surface of each particle to engage said drying plate,
  (g) said layer being heated to a temperature whereby the frozen moisture in said food product is rapidly vaporized without melting the moisture contained therein and without scorching said food product,

(h) condensing said vaporized moisture, and
(i) continuously removing said dried food product from said vacuum chamber.

2. The process of claim 1 wherein said material is cascaded downwardly over a plurality of drying plates in sequence.

3. The process of claim 1 wherein said drying plates are rigidly attached to said vacuum chamber and the entire vacuum chamber is vibrated.

4. A dehydrated readily re-constitutable powder consisting of avocado flesh produced by the method of claim 1.

References Cited

UNITED STATES PATENTS

| | | | |
|---|---|---|---|
| 2,616,604 | 11/1952 | Folsom | 53—22 |
| 2,751,687 | 6/1956 | Colton | 34—5 |

FOREIGN PATENTS

| | | |
|---|---|---|
| 586,693 | 3/1947 | Great Britain. |
| 313,992 | 7/1956 | Switzerland. |

MAURICE W. GREENSTEIN, *Primary Examiner.*

U.S. Cl. X.R.

34—5, 92; 99—71, 204, 206

PO-1050
(5/69)

UNITED STATES PATENT OFFICE
CERTIFICATE OF CORRECTION

Patent No. 3,445,247      Dated May 20, 1969

Inventor(s) Francis K. Baerwald

It is certified that error appears in the above-identified patent and that said Letters Patent are hereby corrected as shown below:

Column 5 - Line 62, Change "21" to --51;

Column 5 - Line 53, Change "52" to --55;

Claim 3, Change Claim "1" to Claim --2.

SIGNED AND
SEALED

OCT 21 1969

(SEAL)
Attest:

Edward M. Fletcher, Jr.
Attesting Officer

WILLIAM E. SCHUYLER, JR.
Commissioner of Patents